(12) United States Patent
Zhang et al.

(10) Patent No.: US 9,113,419 B2
(45) Date of Patent: *Aug. 18, 2015

(54) METHODS AND APPARATUS FOR DOWNLINK PDSCH POWER SETTING

(71) Applicant: Samsung Electronics Co., LTD, Suwon-si, Gyeonggi-do (KR)

(72) Inventors: Jianzhong Zhang, Plano, TX (US); Zhouyue Pi, Allen, TX (US); Farooq Khan, Allen, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 183 days.

This patent is subject to a terminal disclaimer.

(21) Appl. No.: 13/966,102

(22) Filed: Aug. 13, 2013

(65) Prior Publication Data

US 2014/0010181 A1 Jan. 9, 2014

Related U.S. Application Data

(63) Continuation of application No. 13/541,293, filed on Jul. 3, 2012, now Pat. No. 8,509,350.

(51) Int. Cl.
*H04W 72/04* (2009.01)
*H04W 52/14* (2009.01)
(Continued)

(52) U.S. Cl.
CPC ............ *H04W 52/146* (2013.01); *H04W 52/16* (2013.01); *H04W 52/143* (2013.01); *H04W 52/325* (2013.01); *H04W 52/343* (2013.01); *Y02B 60/50* (2013.01)

(58) Field of Classification Search
None
See application file for complete search history.

(56) References Cited

U.S. PATENT DOCUMENTS

2004/0048619 A1 3/2004 Kim et al.
(Continued)

FOREIGN PATENT DOCUMENTS

JP 2007505571 A 3/2007
(Continued)

OTHER PUBLICATIONS

Notice of Allowance in connection with Japanese Patent Application No. 2013-000126; dated Feb. 12, 2014; 7 pages.
(Continued)

*Primary Examiner* — Hassan Phillips
*Assistant Examiner* — Gautam Sharma

(57) ABSTRACT

Methods and apparatus for transmitting power setting information in a downlink Physical Downlink Shared Channel (PDSCH) in a communication system. In this communication system, a plurality of methods for calculating traffic-to-pilot ratios (T2P) are established. In addition, a mapping scheme between a plurality of overhead signals and a plurality of reference signal (RS) overhead ratios, $\eta_{RS}$, and the plurality of T2P calculation methods is established. A user-specific T2P ratio $P_{B,k}/P_{RS}$ for certain OFDM symbols, a RS overhead ratio $\eta_{RS}$ and a calculation method selected from the plurality of T2P calculation methods are assigned to a wireless terminal. Then, an overhead signal corresponding to both of the assigned RS overhead ratio $\eta_{RS}$ and the assigned T2P calculation method is selected in accordance with the mapping scheme and is transmitted to the wireless terminal. In addition, the user-specific traffic-to-pilot ratio $P_{B,k}/P_{RS}$ is transmitted to the wireless terminal. The wireless terminal may calculate the traffic-to-pilot ratios across different transmission antennas and different OFDM symbols in dependence upon the received traffic-to-pilot ratio $P_{B,k}/P_{RS}$, and the RS overhead ratio and the T2P calculation method indicated by the RS overhead signal.

18 Claims, 9 Drawing Sheets

(51) Int. Cl.
*H04W 52/16* (2009.01)
*H04W 52/32* (2009.01)
*H04W 52/34* (2009.01)

(56) References Cited

U.S. PATENT DOCUMENTS

| | | | |
|---|---|---|---|
| 2005/0083999 | A1 | 4/2005 | Koo et al. |
| 2007/0060145 | A1 | 3/2007 | Song et al. |
| 2009/0041151 | A1* | 2/2009 | Khan et al. .............. 375/267 |
| 2009/0175371 | A1* | 7/2009 | Zhang et al. .............. 375/260 |

FOREIGN PATENT DOCUMENTS

| | | |
|---|---|---|
| JP | 2007527674 A | 9/2007 |
| JP | 2011509621 A | 3/2011 |
| KR | 1020050118062 A | 12/2005 |
| KR | 1020070117125 A | 12/2007 |
| RU | 2264039 C2 | 11/2005 |
| WO | WO 2007/124184 A2 | 11/2007 |

OTHER PUBLICATIONS

3GPP TSG-RAN WG1 #51bis; "Data Power Setting for PDSCH across OFDM Symbols"; Qualcomm Europe; Nov. 5-9, 2007; Jeju, Korea; 4 pages.
3GPP R1-081134; "PDSCH downlink power settings" Ericsson, LGE, Motorola, NEC, Nokia, Nortel, NSN, NTT DoCoMo, Qualcomm, Samsung; Feb. 13, 2008; 8 pages.
Translated Notification of Reason for Rejection in connection with Japanese Patent Application No. 2013-000126; dated Oct. 15, 2013; 7 pages.
3GPP TSG-RAN WG1 #51bis; "Further Discussion on Data Power Setting for PDSCH"; Samsung; Jan. 14-18, 2008; Seville, Spain; 6 pages.
3GPP TS 36.213 V8.3.0, 3rd Generation Partnership Project; Technical Specification Group Radio Access Network; Evolved Universal Terrestrial Radio Access (E-UTRA); Physical layer procedures (Release 8), May 2008, 3 pages.
R1-071826 3GPP TSG-RAN WG1 #48-bis "CM analysis and proposed limited beta factor combination set in support of 16-QAM for E-DCH-Part 2" Mar. 26-30, 2007, 8 pages.
R1-080689 3GPP TSG-RAN WG1 #52 "Further Discussion on Data Power Setting for PDSCH" Sorrento, Italy, Feb. 11-15, 2008, 6 pages.
R1-081230 3GPP TSG-RAN WG1 #52-bis "Further Discussion on Data Power Setting for PDSCH" Shenzhen, China Mar. 31-Apr. 4, 2008, 6 pages.
R1-082785 3GPP TSG RAN WG1 Meeting #54, Issue with the value range of P_A, Jeju Korea, Aug. 18-22, 2008, 6 pages.
European Examination Report dated Sep. 5, 2012 in connection with European Application No. 09150163.5, 7 pages.
Notification of Transmittal of the International Search Report and the Written Opinion of the International Searching Authority, or the Declaration dated Jun. 29, 2009 in connection with PCT Application No. PCT/KR2009/000069.
Gomostaeva Yu. M., "Nevdyaev L.M. Telecommunication technologies, English-Russian thesaurus-handbook", Communications and Business, 2002, 3 pages.
Partial European Search Report dated Sep. 23, 2011 in connection with European Patent Application No. EP 09 15 0163.
3GPP TSG RAN WG1 Meeting #50bis, "Update on Power Scaling and DL RS boosting", Samsung, Oct. 8-12, 2007, 8 pages.
3GPP TSG RAN WG1 Meeting #51, "Power Scaling and DL RS boosting", Samsung, Nov. 5-9, 2007, 8 pages.
3GPP TSG RAN WG1 Meeting #51, "Data Power Setting for PDSCH across OFDM Symbols", Qualcomm Europe, Nov. 5-9, 2007, 4 pages.

* cited by examiner

METHODS AND APPARATUS FOR DOWNLINK PDSCH POWER SETTING

CLAIM OF PRIORITY

This application claims priority to and incorporates by reference the content of U.S. Provisional Patent Application No. 61/006,343 filed on Jan. 7, 2008 and U.S. Provisional Patent Application No. 61/136,328 filed Aug. 28, 2008, and is a continuation of and incorporates by reference the content of U.S. Non-Provisional patent application Ser. No. 13/541,293 filed Jul. 3, 2012, now U.S. Pat. No. 8,509,350, which is a continuation of U.S. Non-Provisional patent application Ser. No. 12/314,239 filed Dec. 5, 2008, now U.S. Pat. No. 8,238,455.

BACKGROUND OF THE INVENTION

1. Field of the Invention

The present invention relates to methods and apparatus for transmitting power setting information in a downlink Physical Downlink Shared Channel (PDSCH) in a communication system.

2. Description of the Related Art

This application, pursuant to 37 C.F.R. §1.57, incorporates by reference the following publications:

[1]. "Chairman's notes", 3GPP RAN WG1#51, November 2007, Jeju, Korea;

[2]. R1-075077, "Way-forward on Data Power Setting for PDSCH across OFDM Symbols", Samsung, LGE, Nortel, Qualcomm, etc., November 2007, Jeju, Korea;

[3]. R1-080047, "Further Discussion on Data Power Setting for PDSCH", Samsung, January 2008, Seville, Spain;

[4]. R1-081600, "Draft LS on information about RAN1 decision regarding downlink power settings", Nokia, Shenzhen, China;

[5]. 3GPP TS 36.213 Standard, Version 8.3.0; and

[6]. U.S. Provisional Patent Application Ser. No. 60/963,681, entitled "Pilot boosting and traffic-to-pilot ratio estimation in a wireless communication system", filed on 7 Aug. 2007.

In RAN1#51 meeting in Jeju, November 2007 [1][2], it was agreed, in order to enable the efficient power and bandwidth utilization at the eNodeB (i.e., base station) for all Orthogonal Frequency Division Multiplexing (OFDM) symbols but at the same time to minimize the signaling or estimation efforts for the data-to-reference signal (RS) Energy Per Resource Element (EPRE) ratio, that:

For each UE, the Physical Downlink Shared Channel (PDSCH)-to-RS EPRE ratios among resource elements (REs) in all the OFDM symbols containing RS are equal, and are denoted by P_A, For each UE, the PDSCH-to-RS EPRE ratios among REs in all the OFDM symbols not containing RS are equal, and are denoted by P_B, For each UE, P_A and P_B are potentially different due to different PDSCH EPRE, The ratio between P_A and P_B is known at the UE. This ratio can be derived from the signaled RS boosting value, and from other signaling that is needed to derive this ratio.

It can be noted that the power available from each antenna port for subcarriers other than the reference signals, such as data subcarriers, vary from OFDM symbol to OFDM symbol. Keeping the power level equal across antennas on these subcarriers results in inefficient use of power because power level is limited to the minimum power level available from a given antenna port even though other ports may have extra power available. Likewise, keeping the power level the same across OFDM symbols on these subcarriers also results in inefficient use of power because power level is limited to the minimum power level available in one OFDM symbol although other OFDM symbols may have extra power available. Another solution could be to puncture some data subcarriers in OFDM symbols containing pilot signals in order to keep the power level the same across the symbols. This approach, however, may result in waste of subcarrier resources thus degrading system performance and capacity.

SUMMARY OF THE INVENTION

It is therefore an object of the present invention to provide an improved method and circuit for efficiently utilizing power during wireless transmission of data among a plurality of transmission antennas.

It is another object to provide a method and circuit for transmitting power setting information in a downlink Physical Downlink Shared Channel (PDSCH).

According to one aspect of the present invention, a method for calculating traffic-to-pilot ratios at a wireless terminal is provided. A table for calculating traffic-to-pilot ratios is established at a wireless terminal. The wireless terminal has a plurality of OFDM symbols available for data transmission, with a subset of the OFDM symbols being used for transmitting reference signals. A reference signal (RS) overhead ratio $\eta_{RS}$ and a traffic-to-pilot ratio $P_{B,k}/P_{RS}$ for certain Orthogonal Frequency Division Multiplexing (OFDM) symbols is received at the wireless terminal. $P_{B,k}$ is a user-specific Energy Per Resource Element (EPRE) power assigned on the non-RS OFDM symbols, and $P_{RS}$ is the RS power per subcarrier. The wireless terminal then calculates traffic-to-pilot ratios across different transmission antennas and different OFDM symbols in dependence upon the calculation table and the number of available transmission antennas in the wireless terminal.

According another aspect of the present invention, a method for transmitting power setting information to a wireless terminal is provided. A plurality of methods for calculating traffic-to-pilot ratios (T2P) are established. In addition, a mapping scheme between a plurality of overhead signals, R_ovhd, and a plurality of reference signal (RS) overhead ratios, $\eta_{RS}$, and the plurality of T2P calculation methods is established. A user-specific traffic-to-pilot ratio $P_{B,k}/P_{RS}$ for certain Orthogonal Frequency Division Multiplexing (OFDM) symbols is assigned to the wireless terminal. A RS overhead ratio $\eta_{RS}$ and a calculation method selected from the plurality of T2P calculation methods are assigned to the wireless terminal. Then, an overhead signal, R_ovhd, corresponding to both of the assigned RS overhead ratio $\eta_{RS}$ and the assigned T2P calculation method is selected in accordance with the mapping scheme and is transmitted to the wireless terminal. In addition, the user-specific traffic-to-pilot ratio $P_{B,k}/P_{RS}$ is transmitted to the wireless terminal.

The RS overhead signal R_ovhd may be transmitted in one of a cell-specific broadcast message and a user-specific radio resource control (RRC) message. The cell-specific broadcast message may be included in one of a Primary Broadcast Channel (BCH) message and a Dynamic BCH message.

The certain traffic-to-pilot ratio $P_{B,k}/P_{RS}$ may be transmitted semi-statically in a radio resource control (RRC) message, or dynamically in a Physical Downlink Control Channel (PDCCH) message.

According yet another aspect of the present invention, a method for calculating traffic-to-pilot ratios at a wireless terminal is provided. The wireless terminal receives a reference signal (RS) overhead signal indicating both of a RS overhead ratio and a method for calculating traffic-to-pilot (T2P) ratios, and a certain traffic-to-pilot ratio $P_{B,k}/P_{RS}$. The wireless terminal calculates the traffic-to-pilot ratios across different transmission antennas and different OFDM symbols in dependence upon the received traffic-to-pilot ratio $P_{B,k}/P_{RS}$, and the RS overhead ratio and the T2P calculation method indicated by the RS overhead signal.

According to still another aspect of the present invention, a method for transmitting a power setting information to a wireless terminal is provided. A plurality of traffic-to-pilot ratios $P_{A,k}/P_{RS}$ and $P_{B,k}/P_{RS}$ for different Orthogonal Frequency Division Multiplexing (OFDM) symbols and different transmission antennas are assigned to the wireless terminal. Then the assigned traffic-to-pilot ratios $P_{A,k}/P_{RS}$ and $P_{B,k}/P_{RS}$ are transmitted explicitly to the wireless terminal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

In this invention, we propose methods and apparatus to improve the performance and reduce the overhead of channel quality indication feedback in a communication system.

Aspects, features, and advantages of the invention are readily apparent from the following detailed description, simply by illustrating a number of particular embodiments and implementations, including the best mode contemplated for carrying out the invention. The invention is also amenable to realization in other and different embodiments, and its several details can be modified in various obvious respects, all without departing from the spirit and scope of the invention. Accordingly, the drawings and description are to be regarded as illustrative in nature, and not as restrictive. The invention is illustrated by way of example, and not by way of limitation, in the figures of the accompanying drawings.

Figure 1:
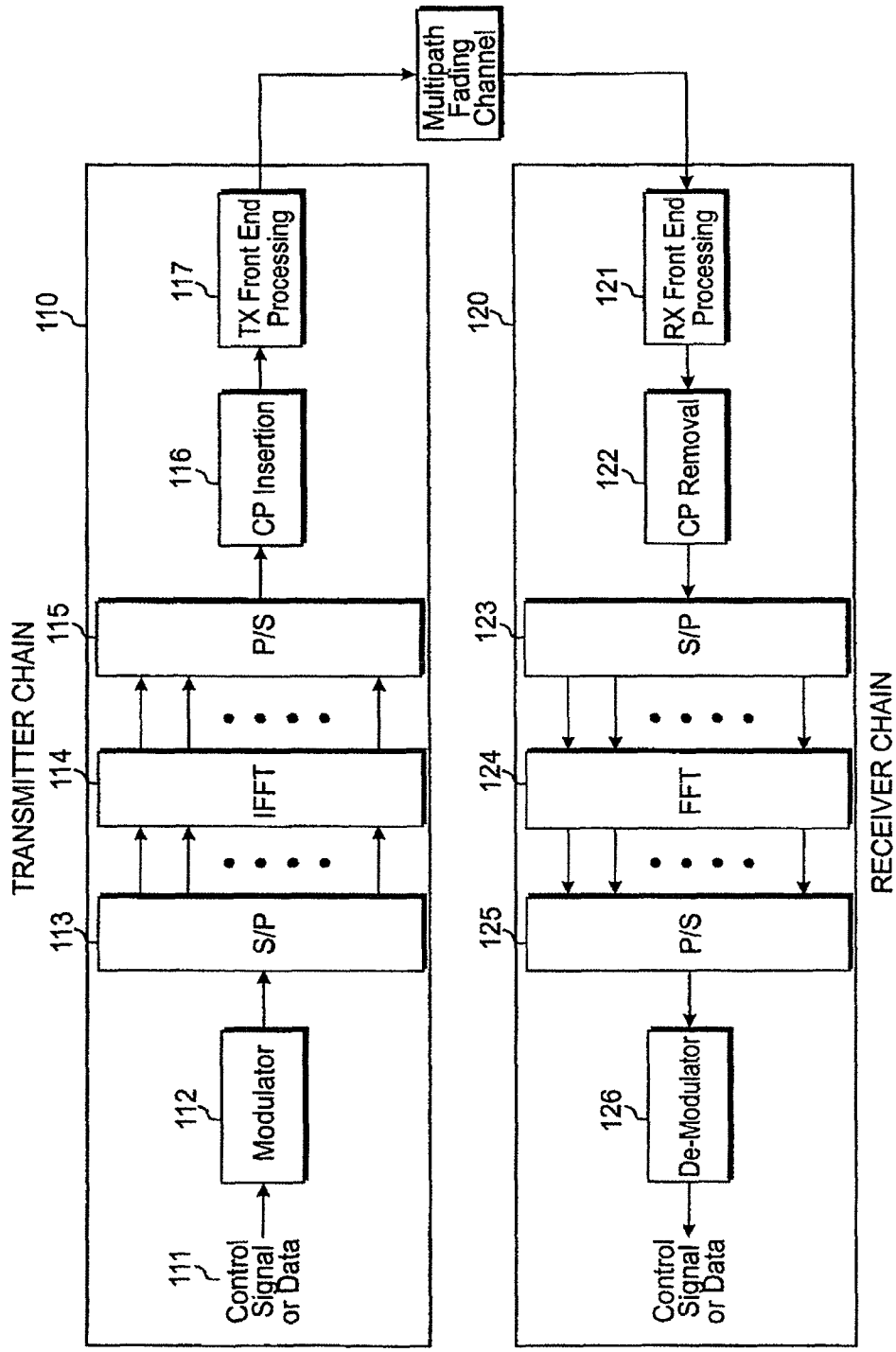
FIG. 1 schematically illustrates an Orthogonal Frequency Division Multiplexing (OFDM) transceiver chain suitable for the practice of the principles of the present inventions.

FIG. 1 illustrates an Orthogonal Frequency Division Multiplexing (OFDM) transceiver chain. In a communication system using OFDM technology, at transmitter chain 110, control signals or data 111 is modulated by modulator 112 and is serial-to-parallel converted by Serial/Parallel (S/P) converter 113. Inverse Fast Fourier Transform (IFFT) unit 114 is used to transfer the signal from frequency domain to time domain. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117 and at least one antenna (not shown), or fixed wire or cable. The signal is transmitted from one or more antennas driven by unit 117 via the atmosphere and is subjected to multipath fading to arrive at a receiver. Note that the multipath fading channel illustrated in FIG. 1 refers to a transmission media (for example, atmosphere), and the multipath fading channel is not a component connected to the receiver, nor to the transmitter. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The basic structure of a multi-carrier signal in the time domain is generally made up of time frames, time slots, and OFDM symbols. A frame consists of a number of time slots, whereas each time slot consists of a number of OFDM symbols. The OFDM time domain waveform is generated by applying the inverse-fast-Fourier-transform (IFFT) to the OFDM signals in the frequency domain. A copy of the last portion of the time waveform, known as the cyclic prefix (CP), is inserted in the beginning of the waveform itself to form the OFDM symbol. Using the cyclic prefix extension, the samples required for performing the FFT at the receiver can be taken anywhere over the length of the symbol. This provides multipath immunity as well as a tolerance for symbol time synchronization errors.

Figure 2:
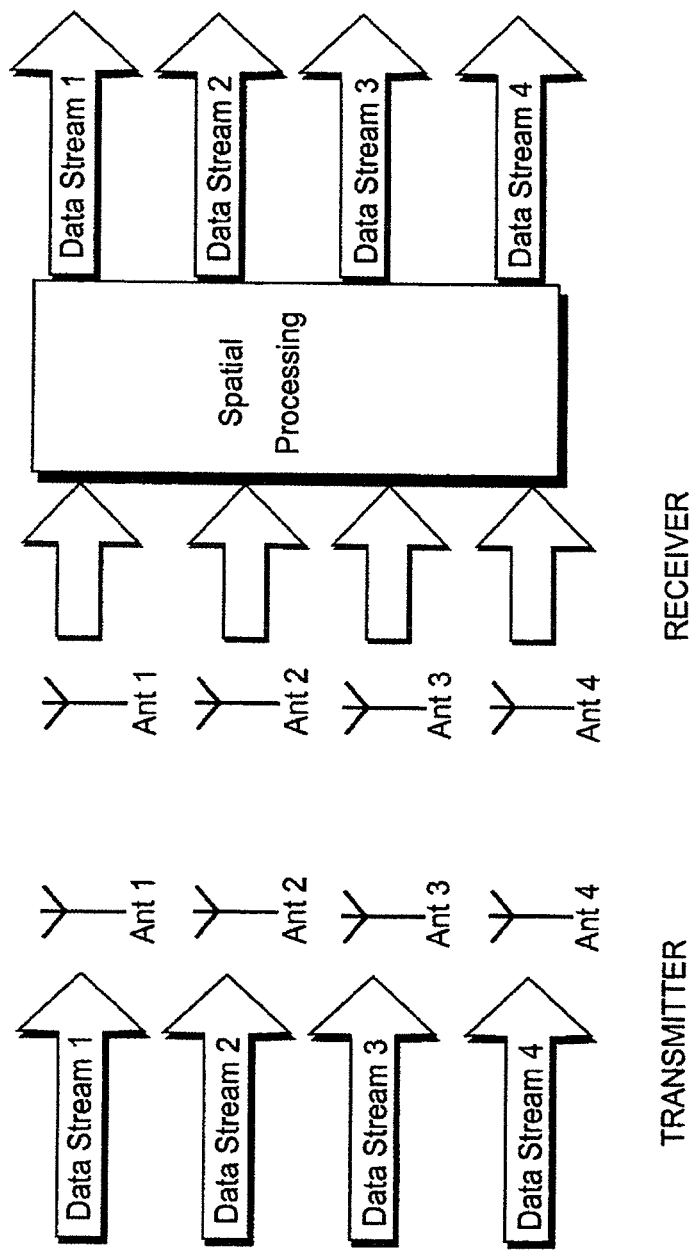
FIG. 2 schematically illustrates a Multiple Input Multiple Output (MIMO) transceiver chain suitable for the practice of the principles of the present inventions.

Multiple Input Multiple Output (MIMO) schemes use multiple transmission antennas and multiple receive antennas to improve the capacity and reliability of a wireless communication channel. A MIMO system promises linear increase in capacity with K where K is the minimum of number of transmit (M) and receive antennas (N), i.e. K=min(M,N). A simplified example of a 4×4 MIMO system is shown in FIG. 2. In this example, four different data streams are transmitted separately from four transmission antennas. The transmitted signals are received at four receive antennas. Some form of spatial signal processing is performed on the received signals in order to recover the four data streams. An example of spatial signal processing is vertical Bell Laboratories Layered Space-Time (V-BLAST) which uses the successive interference cancellation principle to recover the transmitted data streams. Other variants of MIMO schemes include schemes that perform some kind of space-time coding across the transmission antennas (e.g., diagonal Bell Laboratories Layered Space-Time (D-BLAST)) and also beamforming schemes such as Spatial Division multiple Access (SDMA).

Figure 3:
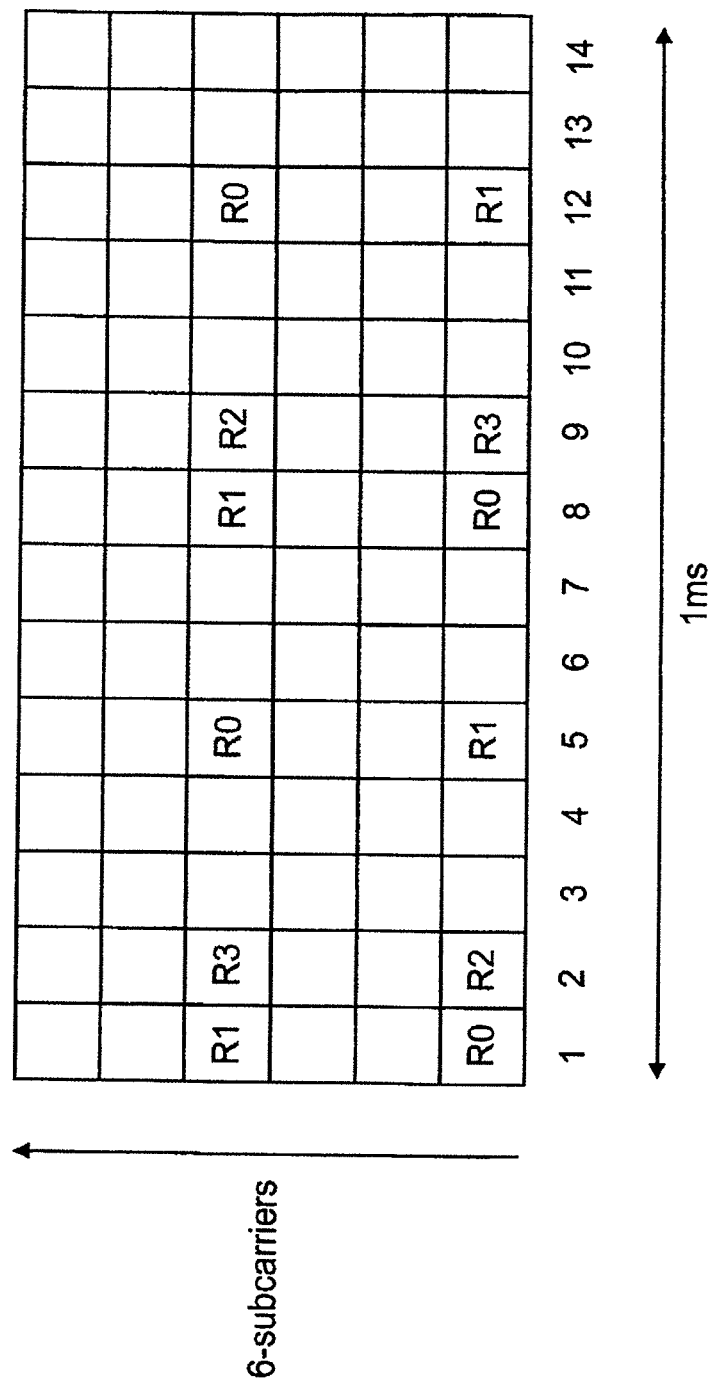
FIG. 3 schematically illustrates an example reference signals transmission over six subcarriers within a subframe via four transmission antennas (4 Tx) suitable for the practice of the principles of the present inventions.

The downlink reference signals mapping for four transmission antennas in the 3GPP LTE ($3^{rd}$ Generation Partnership Project Long Term Evolution) system is shown in FIG. 3. The notation $R_p$ is used to denote a resource element used for reference signal transmission on antenna port p. It can be noted that density on antenna ports 2 and 3 is half the density on antenna ports 0 and 1. This leads to weaker channel estimates on antenna ports 2 and 3 relative to channel estimates on antenna ports 0 and 1.

Figure 4:
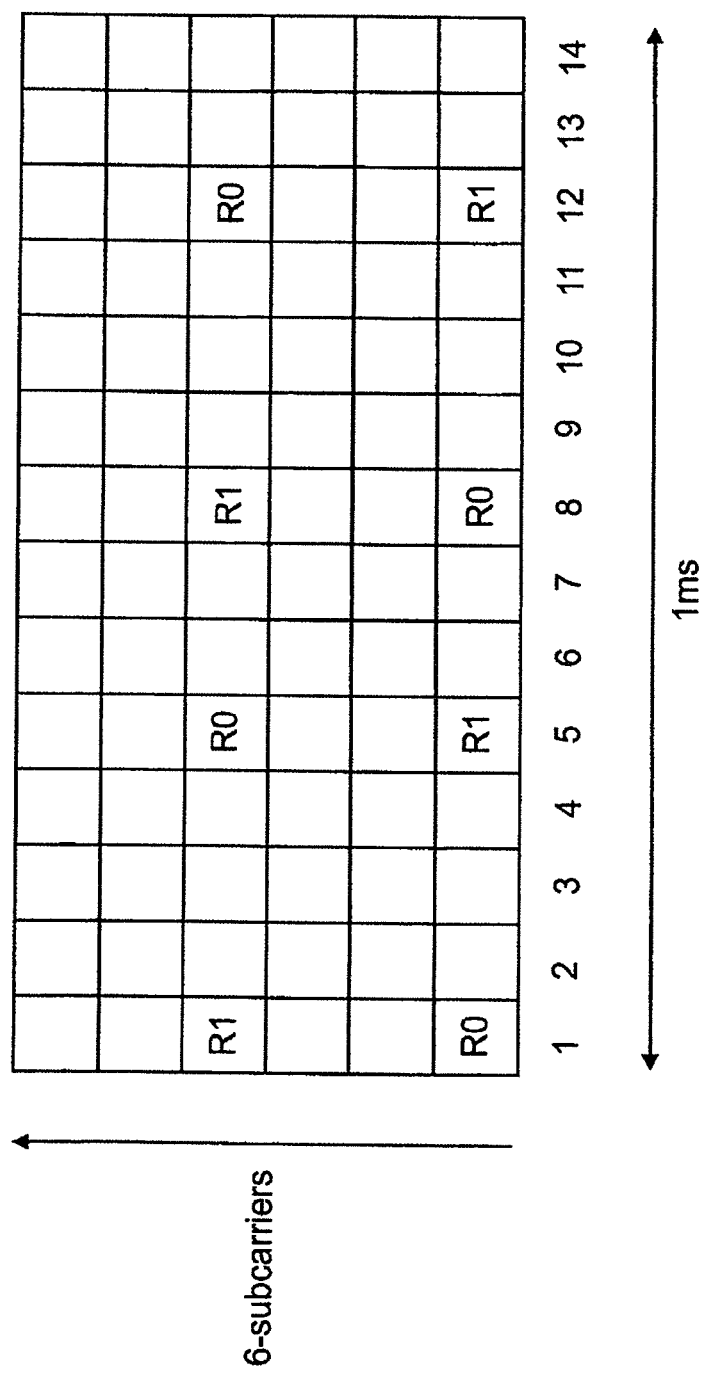
FIG. 4 schematically illustrates an example reference signals transmission over six subcarriers within a subframe via two transmission antennas (2 Tx) suitable for the practice of the principles of the present inventions.
Figure 5:
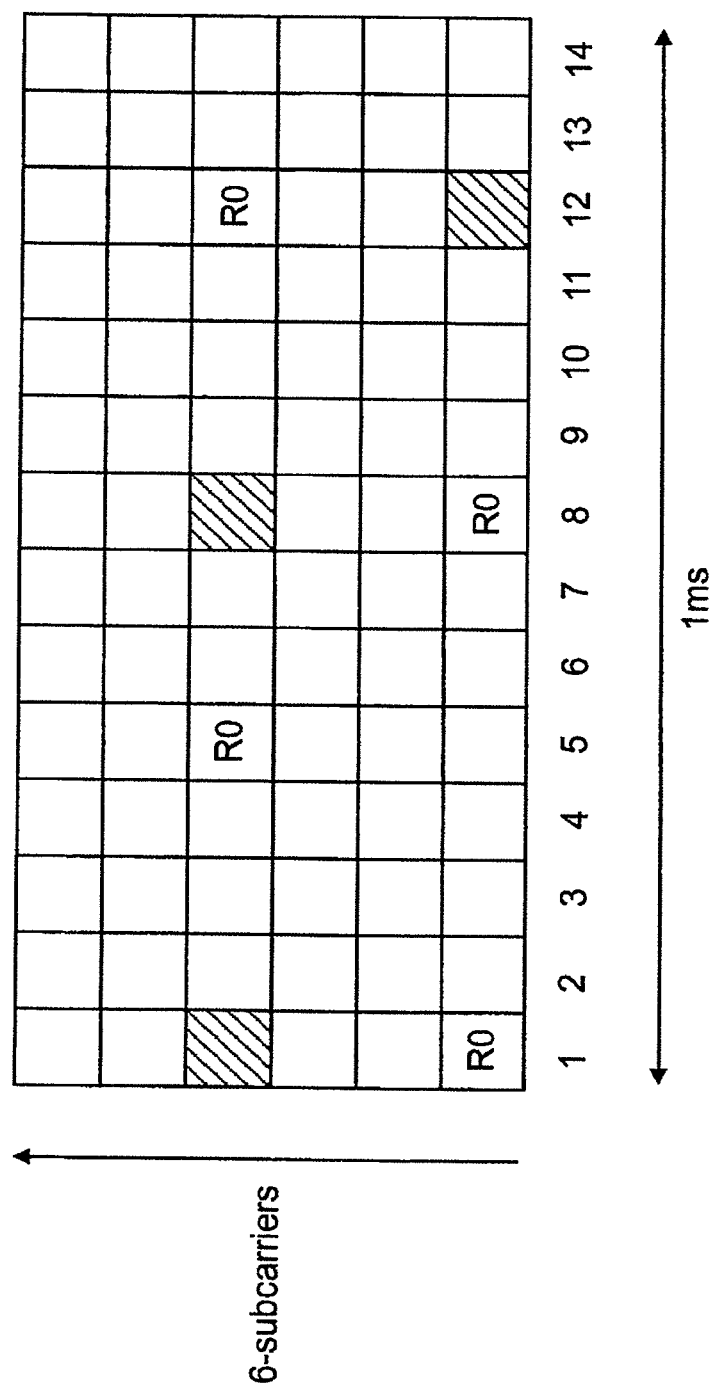
FIG. 5 schematically illustrates an example reference signals transmission over six subcarriers within a subframe via one transmission antenna (1 Tx) suitable for the practice of the principles of the present inventions.

Similarly, FIG. 4 schematically illustrates downlink reference signals mapping for two transmission antennas in the 3GPP LTE system, and FIG. 5 schematically illustrates downlink reference signals mapping for one transmission antenna in the 3GPP LTE system.

Figure 6:
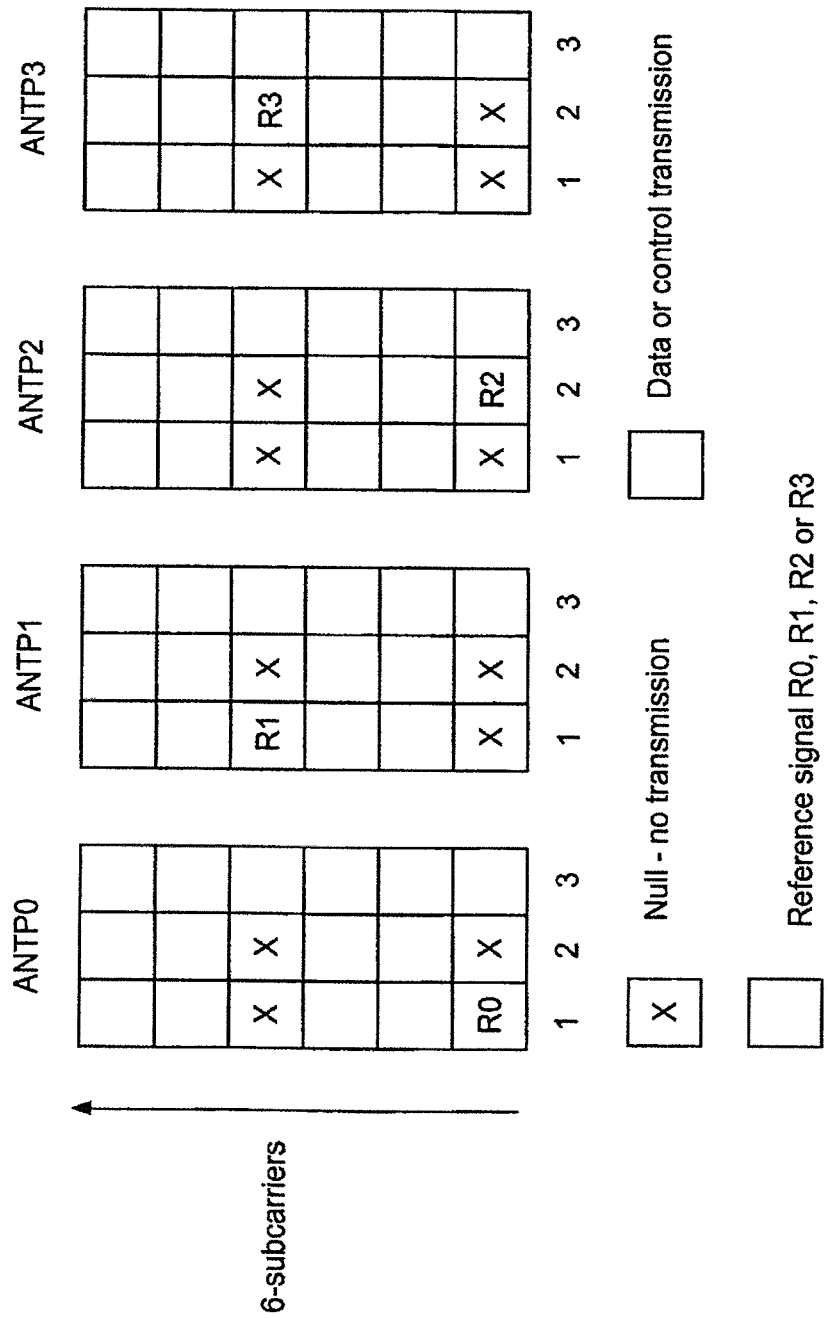
FIG. 6 schematically illustrates an example of mapping of downlink reference signals in OFDM symbols 1 and 2 for four transmission antenna.

An example of reference signals transmission over six subcarriers within the first three OFDM symbols from each of the four antenna ports is shown in FIG. 6. It can be noted that the power available from each antenna port for subcarriers other than the reference signals, e.g., data subcarriers, vary from OFDM symbol to OFDM symbol. Keeping the power level the same across antennas on these subcarriers results in inefficient use of power, because the power level is limited to the minimum power level available from a given antenna port even though other ports may have extra power available. Likewise, keeping the power level the same across OFDM symbols on these subcarriers also results in inefficient use of power, because power level is limited to the minimum power level available in one OFDM symbol although other OFDM symbols may have extra power available. Another solution could be to puncture some data subcarriers in OFDM symbols containing pilots to keep the power level the same across the symbols. This approach, however, may undesirably result in a waste of subcarrier resources thus degrading system performance and capacity.

1. Methods of Calculating Traffic-to-Pilot (T2P) Ratios on all OFDM Symbols for 1, 2, 4 eNodeB Transmit Antennas Cases (1, 2, 4 Tx)

In a first embodiment according to the principles of the present invention, we show how the P_A/P_B ratio is calculated from the RS boosting value, which is represented by the RS overhead as a percentage of total power in the RS OFDM symbol. Furthermore, using the P_A/P_B ratio obtained from the proposed method, we can further specify the T2P ratios on all OFDM symbols, and across different transmit antennas, for cases where we have 1, 2 or 4 transmit antennas (1, 2, or 4 Tx).

Let the total available data power on a non-RS OFDM symbol be $E_B$, and let the total available data power on an RS OFDM symbol be $E_A = (1-\eta_{RS})E_B$, where $\eta_{RS}$ is the total RS power as a percentage of the total power on the RS OFDM symbol. For the k-th user (i.e., UE), let the pair $(P_{B,k}, N_{B,k})$ be the EPRE power and the number of subcarriers assigned on the non-RS OFDM symbols; and let the pair $(P_{A,k}, N_{A,k})$ be the EPRE power and the number of subcarriers assigned on the RS OFDM symbols.

1. For Two (2) Tx (2 eNode-B Transmit Antenna) and Four (4) Tx Case.

We have $$N_{A,k} = \frac{2}{3} N_{B,k}$$

due to the RS structure in LTE where 2 out of every 6 subcarriers are reserved for RS in RS OFDM symbols (see FIGS. 1 and 2). Furthermore, we propose the ratio between the two data EPREs as:

$$\alpha = \frac{P_{A,k}}{P_{B,k}} = \frac{3}{2}(1-\eta_{RS}),$$

for k=1, ... K, where K is the total number of UEs scheduled. Note the above ratio enables us to use maximum power in both RS and non-RS OFDM symbols at the same time. To see this, assume a power-control policy on the non-RS OFDM symbols where $$\sum_{k=1}^{K} P_{B,k} N_{B,k} = E_B,$$

i.e. max power is used in the non-RS OFDM symbols, then it is easy to verify that $$\sum_{k=1}^{K} P_{A,k} N_{A,k} = \sum_{k=1}^{K} \frac{3}{2}(1-\eta_{RS}) P_{B,k} \frac{2}{3} N_{B,k} = (1-\eta_{RS}) E_B = E_A, \quad (2)$$

which indicates the full use of power on RS OFDM symbols.

2. For One (1) Tx Case.

We have $$N_{A,k} = \frac{5}{6} N_{B,k}$$

due to the RS structure in LTE where 1 out of every six subcarriers is reserved for RS in RS OFDM symbols (see FIG. 3). Furthermore, we propose the ratio between the two data EPREs as:

$$\alpha = \frac{P_{A,k}}{P_{B,k}} = \frac{6}{5}(1-\eta_{RS}). \quad (3)$$

We now organize the above proposal into tables that indicate the Traffic-to-Pilot (T2P) ratios on different antennas and different OFDM symbols. Note 'i' is the OFDM symbol index and i=1, ... 14, and t is the transmit antenna index.

Table 1 shows the T2P ratios on all OFDM symbols within a subframe and on all antennas for 1 Tx case. Here i∈{1, 5, 8, 12} is the set of OFDM symbols with RS in the normal CP situation, whereas i∈{2, 3, 4, 6, 7, 9, 10, 11, 13, 14} is the set of OFDM symbols without RS in the normal CP situation with 1 Tx.

TABLE 1

The T2P ratio for 1Tx case.

| | $i \in \{1,5,8,12\}$ | $i \in \{2,3,4,6,7,9,10,11,13,14\}$ |
|---|---|---|
| $t \in \{0\}$ | $\frac{6}{5}(1-\eta_{RS})\frac{P_{B,k}}{P_{RS}}$ | $\frac{P_{B,k}}{P_{RS}}$ |

Table 2 shows the T2P ratios on all OFDM symbols within a subframe and on all antennas for 2 Tx case. Here $i \in \{1, 5, 8, 12\}$ is the set of OFDM symbols with RS in the normal CP situation, whereas $i \in \{2, 3, 4, 6, 7, 9, 10, 11, 13, 14\}$ is the set of OFDM symbols without RS in the normal CP situation with 2 Tx.

TABLE 2

The T2P ratio for 2Tx case.

| | $i \in \{1,5,8,12\}$ | $i \in \{2,3,4,6,7,9,10,11,13,14\}$ |
|---|---|---|
| $t \in \{0,1\}$ | $\frac{3}{2}(1-\eta_{RS})\frac{P_{B,k}}{P_{RS}}$ | $\frac{P_{B,k}}{P_{RS}}$ |

Table 3 shows the T2P ratios on all OFDM symbols within a subframe and on all antennas for 4 Tx case. Here $i \in \{1, 2, 5, 8, 9, 12\}$ is the set of OFDM symbols with RS in the normal CP situation, whereas $i \in \{3, 4, 6, 7, 10, 11, 13, 14\}$ is the set of OFDM symbols without RS in the normal CP situation with 4 Tx.

TABLE 3

The T2P ratio for 4Tx case.

| | $i \in \{1,2,5,8,9,12\}$ | $i \in \{3,4,6,7,10,11,13,14\}$ |
|---|---|---|
| $t \in \{0,1,2,3\}$ | $\frac{3}{2}(1-\eta_{RS})\frac{P_{B,k}}{P_{RS}}$ | $\frac{P_{B,k}}{P_{RS}}$ |

The k-th UE needs to know $P_{B,k}$ and RS overhead ratio $\eta_{RS}$ to derive $P_{A,k}$. In practice, T2P ratio is more often used then the actual power, so the k-th UE needs to know $P_{B,k}/P_{RS}$ and RS overhead ratio $\eta_{RS}$ to derive $P_{A,k}/P_{RS}$. Here $P_{RS}$ is the per-subcarrier RS power.

It is important to note that while this ratio allows full use of power in both RS and non-RS OFDM symbols, this ratio does not mandate that full power being used at all time. In fact, simply removing one UE from the K UEs provides an example of not fully using the eNB power.

Examples (For 2 Tx Case)
1. If $\eta_{RS}=1/3$, then we have $$\alpha = \frac{P_{A,k}}{P_{B,k}} = \frac{3}{2}(1-\eta_{RS}) = 1.$$

This is the case where the percentage of total power and total bandwidth used for RS overhead is the same. We sometimes refer to this case as "non-boosted RS".

2. If $\eta_{RS}=2/3$, then we have $$\alpha = \frac{P_{A,k}}{P_{B,k}} = \frac{3}{2}(1-\eta_{RS}) = \frac{1}{2}.$$

This is an example of so-called "boosted" case where more percentage of power than bandwidth is used for RS overhead. We note that the data RE powers on the RS OFDM symbols have to be reduced to make room for the RS "boosting".

2. Other Alternatives for Calculating T2P Ratios in Four (4) Tx Case

For the 4 Tx case, it is noteworthy that if we set T2P according to Table 3, then for the RS OFDM symbols, not all antennas are able to transmit at full power. This is due to the fact that for a given OFDM symbol, only half of the antennas will transmit RS, while the other RS will not. If we require equal T2P across all antennas in the RS OFDM symbol, then we are limited to the solution in Table 4.

In a second embodiment according to the principles of the present invention, we allow different T2P values across both antennas and OFDM symbols, and get the following table as one possible 4 Tx solution.

TABLE 4

Further improvement for 4Tx case allowing different T2P ratio across antennas and OFDM symbols.

| | $i \in \{1,5,8,12\}$ | $i \in \{2,9\}$ | $i \in \{3,4,6,7,10,11,13,14\}$ |
|---|---|---|---|
| $t \in \{0,1\}$ | $\frac{3}{2}(1-\eta_{RS})\frac{P_{B,k}}{P_{RS}}$ | $\frac{3}{2}\frac{P_{B,k}}{P_{RS}}$ | $\frac{P_{B,k}}{P_{RS}}$ |
| $t \in \{2,3\}$ | $\frac{3}{2}\frac{P_{B,k}}{P_{RS}}$ | $\frac{3}{2}(1-\eta_{RS})\frac{P_{B,k}}{P_{RS}}$ | $\frac{P_{B,k}}{P_{RS}}$ |

In a third embodiment according to the principles of the present invention, we allow the 4 Tx antennas to share the RS power overhead in the RS OFDM symbols. This can be achieved by schemes such as using virtual antennas to share the power between different physical antennas. In this case, a virtual antenna is basically a fixed pre-coding vector applied on the existing physical antennas, and therefore can potentially use the power on all physical antennas. As a result, the T2P ratio across antennas and OFDM symbols are given by Table 5.

TABLE 5

Further improvement for 4Tx case allowing different T2P ratio across OFDM symbols.

| | $i \in \{1,2,5,8,9,12\}$ | $i \in \{3,4,6,7,10,11,13,14\}$ |
|---|---|---|
| $t \in \{0,1,2,3\}$ | $\frac{3}{4}(2-\eta_{RS})\frac{P_{B,k}}{P_{RS}}$ | $\frac{P_{B,k}}{P_{RS}}$ |

3. Signaling of the Parameters Related to DL PDSCH Power Setting.

We further note that the eNodeB (eNB) supports discrete levels of $\eta_{RS}$, and we can use a few bits (for example 3 bits) to represent the $\eta_{RS}$ level. Furthermore, we denote R_ovhd as the eNodeB signaling indicating both the $\eta_{RS}$ level and the method of computing all the T2P ratios across all antennas and OFDM symbols, according to one of the tables (Tables 1-5) as shown above.

In a fourth embodiment according to the principles of the present invention, one method of such mapping of R_ovhd to $\eta_{RS}$ level and the method of computing the T2P ratios is illustrated below in Table 6. An example of 3-bit R_ovhd is shown in this example, and 4 Tx case is assumed. In this example, we observe that the methods specified in Table 3 is used for all R_ovhd entries. The number of bits used for R_ovhd can be other than 3 bits used in this example.

TABLE 6

Example of mapping of R_ovhd to $\eta_{RS}$ level and the method of computing the T2P ratios. 3-bit R_ovhd and 4Tx assumed.

| R_ovhd | $\eta_{RS}$ Level | T2P calculation method |
|---|---|---|
| 000 | 1/6 = 16.66% | T2P ratio method specified |
| 001 | 1/3 | in Table 3, for 4Tx case. |
| 010 | 3/6 | |
| 011 | 4/6 | |
| 100 | 5/6 | |
| 101 | 6/6 | |
| 110 | Reserved | |
| 111 | Reserved | |

Similar tables (where the same T2P calculations method is applied to all entries) can be constructed for 1 Tx case with Table 1 method, and 2 Tx case with Table 2 method, and 4 Tx case with Table 4 method, and finally 4 Tx case with Table 5 method.

For example, a 3-bit R-ovhd design for 2 Tx eNodeB transmit antenna case is shown in Table 7 below, where all R_ovhd entries will use T2P calculation method specified in Table 2.

TABLE 7

Example of mapping of R_ovhd to $\eta_{RS}$ level and the method of computing the T2P ratios. 3-bit R_ovhd and 2Tx assumed.

| R_ovhd | $\eta_{RS}$ Level | T2P calculation method |
|---|---|---|
| 000 | 1/6 = 16.66% | T2P ratio method specified |
| 001 | 1/3 | in Table 2, for 2Tx case. |
| 010 | 3/6 | |
| 011 | 4/6 | |
| 100 | 5/6 | |
| 101 | 6/6 | |
| 110 | Reserved | |
| 111 | Reserved | |

In a fifth embodiment according to the principles of the present invention, another method of such mapping of R_ovhd to $\eta_{RS}$ level and the method of computing the T2P ratios is illustrated below in Table 8. An example of 3-bit R_ovhd is shown in this example, and 4 Tx case is assumed as an example. In this example, we observe that different methods can be used for different entries—the first 5 entries use T2P calculation method specified in Table 3, whereas the last 3 entries use T2P calculation method specified in Table 5.

TABLE 8

Example of mapping of R_ovhd to $\eta_{RS}$ level and the method of computing the T2P ratios. 3-bit R_ovhd and 4Tx assumed.

| R_ovhd | $\eta_{RS}$ Level | T2P calculation method |
|---|---|---|
| 000 | 1/6 = 16.66% | T2P ratio method specified |
| 001 | 1/3 | in Table 3, for 4Tx case. |
| 010 | 3/6 | |
| 011 | 4/6 | |
| 100 | 5/6 | |
| 101 | 1/3 | T2P ratio method specified |
| 110 | 3/6 | in Table 5, for 4Tx case |
| 111 | 4/6 | |

In a sixth embodiment according to the principles of the present invention, we propose to include the RS overhead signal R_ovhd in either the cell-specific broadcast message or UE-specific radio resource control (RRC) message. Note the cell-specific broadcast message can be either included in Primary Broadcast Channel (BCH) messages, or Dynamic BCH messages (also known as SU). This can be in addition to the UE-specific signaling of $$\frac{P_{B,k}}{P_{RS}}$$

for k-th UE (if such a $$\frac{P_{B,k}}{P_{RS}}$$

signal is sent from the eNB at all), where this UE-specific signaling can be either semi-static via RRC signaling or dynamic via Physical Downlink Control Channel (PDCCH) signaling.

After receiving R_ovhd, the UE looks the mapping table of R_ovhd (examples of these tables are shown in Tables 6-8) and obtain $\eta_{RS}$ level, as well the method of computing the T2P ratios across all antennas and all OFDM symbols. The UE then use both the obtained $\eta_{RS}$ and $$\frac{P_{B,k}}{P_{RS}}$$

to calculate all other T2P ratios across different antennas and OFDM symbols, according to the method of computing the T2P ratios decoded from R_ovhd value.

Figure 7:
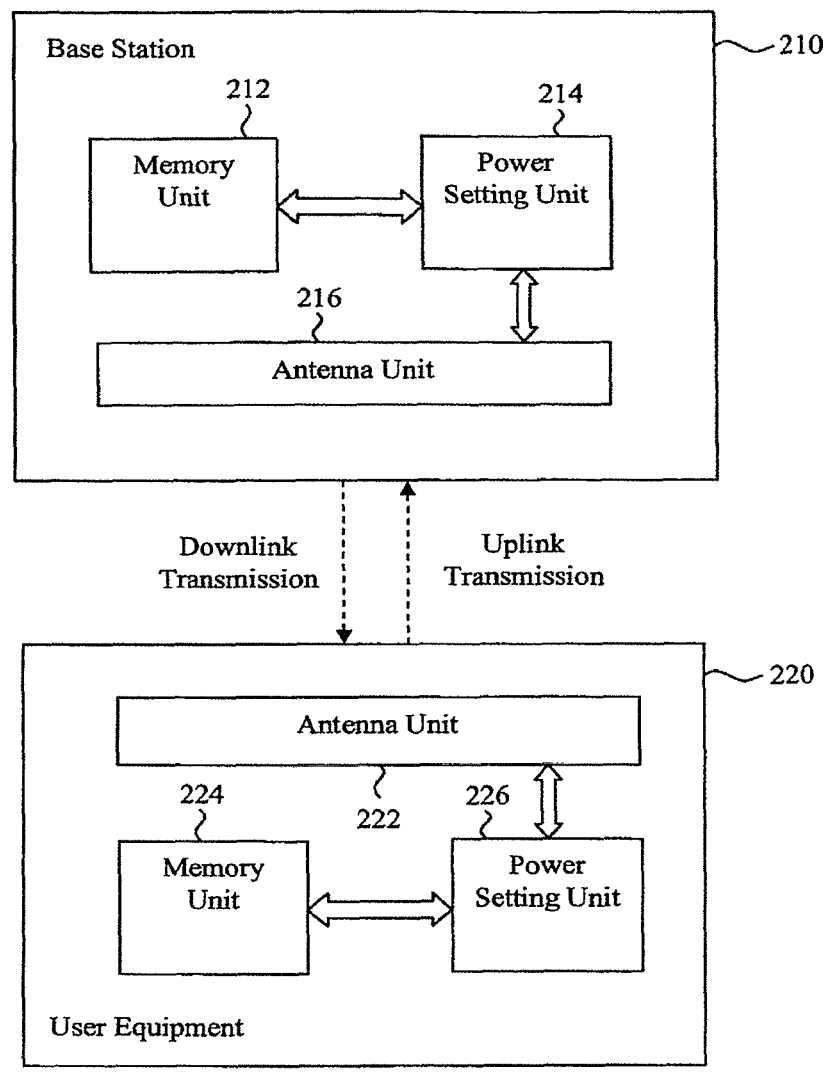
FIG. 7 schematically illustrates a wireless system including the base station (eNodeB) and the user equipment as an embodiment according to the principles of the present invention.

FIG. 7 schematically illustrates a wireless system including the base station (eNodeB) and the user equipment as an embodiment according to the principles of the present invention. As illustrated in FIG. 7, base station 210 is constructed with a memory unit 212, a power setting unit 214, and an antenna unit 216 including at least one antenna. Memory unit 212 stores a plurality of methods for calculating traffic-to-pilot ratios (T2P) as given in Tables 1-5, and stores a mapping scheme between a plurality of overhead signals, and a plurality of reference signal (RS) overhead ratios and the plurality of T2P calculation methods as given in Table 6-8. Power setting unit 214 assigns a user-specific traffic-to-pilot ratio $P_{B,k}/P_{RS}$, a RS overhead ratio $\eta_{RS}$, and a calculation method selected from the plurality of T2P calculation methods to user equipment 220. Antenna unit 216 transmits an overhead signal corresponding to both of the assigned RS overhead ratio $\eta_{RS}$ and the assigned T2P calculation method in accordance with the mapping scheme, and the user-specific traffic-to-pilot ratio $P_{B,k}/P_{RS}$, to user equipment 220.

Similarly, as illustrated in FIG. 7, user equipment 220 is constructed with a memory unit 224, a power setting unit 226, and an antenna unit 222 including at least one antenna. Antenna unit 222 receives an overhead signal and a user-specific traffic-to-pilot ratio $P_{B,k}/P_{RS}$ from base station 210. Memory unit 224 stores a plurality of methods for calculating traffic-to-pilot ratios (T2P) as given in Tables 1-5, and stores a mapping scheme between a plurality of overhead signals, and a plurality of reference signal (RS) overhead ratios and the plurality of T2P calculation methods as given in Table 6-8. Power setting unit 226 determines a RS overhead ratio and a T2P calculation method independence upon the received RS overhead signal and the mapping scheme stored in memory unit, and calculates the traffic-to-pilot ratios across different transmission antennas and different OFDM symbols in dependence upon the received traffic-to-pilot ratio $P_{B,k}/P_{RS}$, and the RS overhead ratio and the T2P calculation method.

Figure 8:
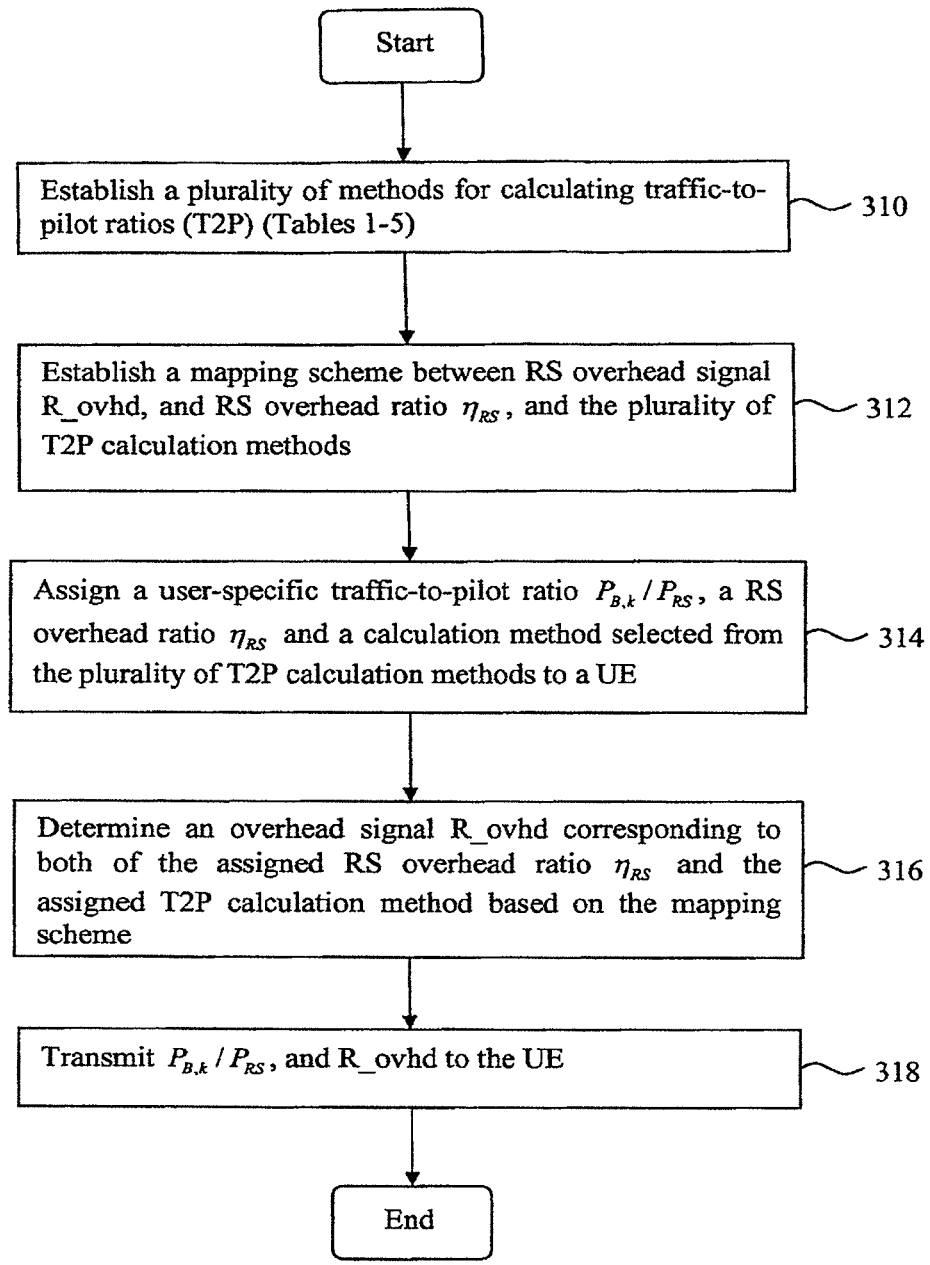
FIG. 8 schematically illustrates a flow chart outlining a process for transmitting downlink power setting information at a base station (BS) as an embodiment constructed according to the principles of the present invention.

FIG. 8 schematically illustrates a flow chart outlining a process for transmitting downlink power setting information at a base station (BS) as an embodiment according to the principles of the present invention. First, a plurality of methods for calculating traffic-to-pilot ratios (T2P) are established and stored at the BS via step 310. Then, a mapping scheme between a plurality of overhead signals, R_ovhd, and a plurality of reference signal (RS) overhead ratios, $\eta_{RS}$, and the plurality of T2P calculation methods is established and stored at the BS via step 312. A user-specific traffic-to-pilot ratio $P_{B,k}/P_{RS}$ for certain Orthogonal Frequency Division Multiplexing (OFDM) symbols, and a RS overhead ratio $\eta_{RS}$ and a calculation method selected from the plurality of T2P calculation methods are assigned to a unit of user equipment via step 314. An overhead signal, R_ovhd, corresponding to both of the assigned RS overhead ratio $\eta_{RS}$ and the assigned T2P calculation method is determined in accordance with the mapping scheme via step 316. Finally, the user-specific traffic-to-pilot ratio $P_{B,k}/P_{RS}$, and the overhead signal, R_ovhd, are transmitted to the user equipment via step 318.

Figure 9:
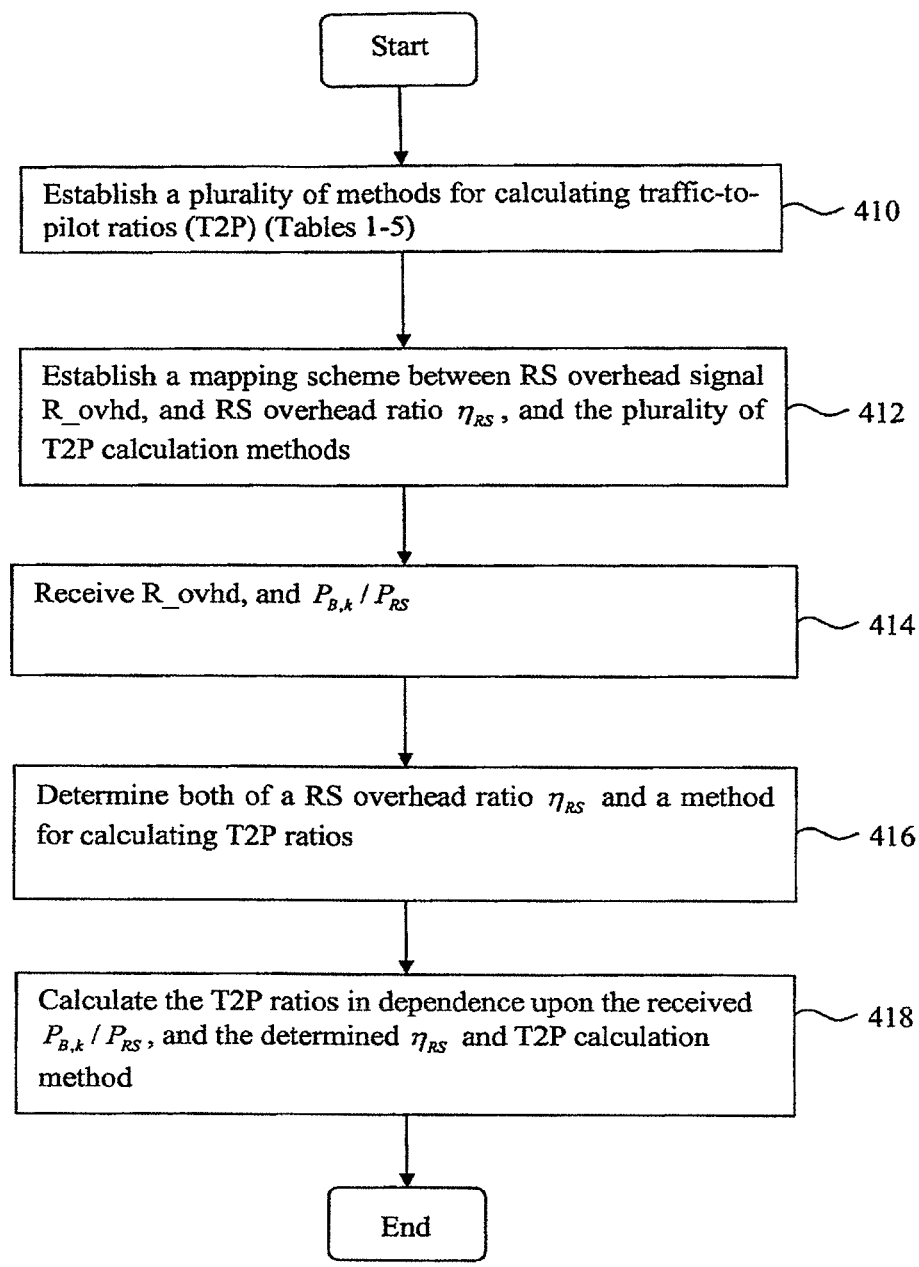
FIG. 9 schematically illustrates a flow chart outlining a process for calculating power setting information at a unit of user equipment as an embodiment constructed according to the principles of the present invention.

FIG. 9 schematically illustrates a flow chart outlining a process for calculating power setting information at a unit of user equipment as an embodiment according to the principles of the present invention. First, a plurality of methods for calculating traffic-to-pilot ratios (T2P) are established and stored at the UE via step 410. Then, a mapping scheme between a plurality of overhead signals, R_ovhd, and a plurality of reference signal (RS) overhead ratios, $\eta_{RS}$, and the plurality of T2P calculation methods is established and stored at the UE via step 412. The UE receives a reference signal (RS) overhead signal and certain traffic-to-pilot ratio $P_{B,k}/P_{RS}$ via step 414. The UE determines both of a RS overhead ratio and a method for calculating traffic-to-pilot (T2P) ratios in dependence upon the mapping scheme via step 416. Finally, the UE calculates the traffic-to-pilot ratios across different transmission antennas and different OFDM symbols in dependence upon the received traffic-to-pilot ratio $P_{B,k}/P_{RS}$, and the RS overhead ratio and the T2P calculation method determined via step 418.

In a seventh embodiment according to the principles of the present invention, we propose to send the either a UE-specific $$\frac{P_{A,k}}{P_{B,k}}$$

ratio, or a UE-specific $$\frac{P_{A,k}}{P_{RS}}$$

ratio, for the k-th UE semi-statically via RRC signaling. This is in addition to the UE-specific signaling of $$\frac{P_{B,k}}{P_{RS}}$$

for k-th UE, where this UE-specific signaling can be either semi-static via RRC signaling or dynamic via PDCCH signaling. In this case, at the UE side, all T2P ratios are determined directly from the signaling from the eNB.

In an eighth embodiment according to the principles of the present invention, the eNodeB determines the downlink transmit energy per resource element.

A UE may assume downlink reference symbol Energy Per Resource Element (EPRE) is constant across the downlink system bandwidth and is constant across all subframes until different RS power information is received.

For each UE, the PDSCH-to-RS EPRE ratio among PDSCH REs in all the OFDM symbols not containing RS is equal and is denoted by $\rho_A$. The UE may assume that for 16QAM or 64QAM or RI>1 spatial multiplexing, $\rho_A$ is equal to $P_A$ which is a UE specific semi-static parameter signaled in dB by higher layers in the range of [3, 2, 1, 0, −1, −2, −3, −6] using 3-bits.

For each UE, the PDSCH-to-RS EPRE ratio among PDSCH REs in all the OFDM symbols containing RS is equal and is denoted by $\rho_B$. The cell-specific ratio $\rho_B/\rho_A$ is given by Table 9 according to cell-specific parameter $P_B$ signaled by higher layers and the number of configured eNodeB cell specific antenna ports.

TABLE 9

Ratio of PDSCH-to-RS EPRE in symbols with and without reference symbols for 1, 2, or 4 cell specific antenna ports

| | $\rho_B/\rho_A$ | |
|---|---|---|
| $P_B$ | One Antenna Port | Two and Four Antenna Ports |
| 0 | 1 | 5/4 |
| 1 | 4/5 | 1 |
| 2 | 3/5 | 3/4 |
| 3 | 2/5 | 1/2 |

For PMCH with 16QAM or 64QAM, the UE may assume that the PMCH-to-RS EPRE ratio is equal to 0 dB.

Note in the above Table 9, we use the notion in Reference [5] (TS 36.213 version 8.3.0). Table 10 summarizes the difference in the notations used in the original DOI, Reference [1] (Chairmen's note 2007 Jeju), and Reference [5] (TS 36.213 version 8.3.0).

TABLE 10

Different notations used in the present invention, Reference [1] and Reference [5]

| | T2P (Traffic to pilot ratio) in OFDM symbols with RS | T2P (Traffic to pilot ratio) in OFDM symbols without RS |
|---|---|---|
| Present invention | $\frac{P_{A,k}}{P_{RS}}$ (for user k) | $\frac{P_{B,k}}{P_{RS}}$ (for user k) |
| Reference [1] | P_A | P_B |
| Reference [5] | $\rho_B$ | $\rho_A$ |

Now we will observe Tables 1-3. In Tables 1-3, the second column are the T2P for OFDM symbols with RS, which is $$\frac{P_{A,k}}{P_{RS}} = \frac{6}{5}(1-\eta_{RS})\frac{P_{B,k}}{P_{RS}}$$

in one antenna case, and $$\frac{P_{A,k}}{P_{RS}} = \frac{3}{2}(1-\eta_{RS})\frac{P_{B,k}}{P_{RS}}$$

in the two or four antenna case. In other words, $$\frac{P_{A,k}}{P_{RS}} \bigg/ \frac{P_{B,k}}{P_{RS}} = \frac{6}{5}(1-\eta_{RS})$$

in one antenna case, and $$\frac{P_{A,k}}{P_{RS}} \Big/ \frac{P_{B,k}}{P_{RS}} = \frac{3}{2}(1 - \eta_{RS})$$

in the two or four antenna case.

Now, if we assume $\eta_{RS}$ equals to 1/6, 1/3, 3/6, 4/6, we can obtain the corresponding values for $$\frac{P_{A,k}}{P_{RS}} \Big/ \frac{P_{B,k}}{P_{RS}}$$

summarized in Table 11.

TABLE 11

Different values of $\frac{P_{A,K}}{P_{RS}} \Big/ \frac{P_{B,K}}{P_{RS}} (\rho_B/\rho_A)$

| | | $\rho_B / \rho_A \left( \frac{P_{A,k}}{P_{RS}} \Big/ \frac{P_{B,k}}{P_{RS}} \right.$ in the notation of the present invention) | |
|---|---|---|---|
| $\eta_{RS}$ | $P_B$ | One Antenna Port | Two and Four Antenna Ports |
| 1/6 | 0 | 1 | 5/4 |
| 1/3 | 1 | 4/5 | 1 |
| 3/6 | 2 | 3/5 | 3/4 |
| 4/6 | 3 | 2/5 | 1/2 |

Note that $P_B$ in Tables 9 and 11 is a parameter signaled from the eNB (base station) to the user equipment (UE). For example, instead of signaling a physical value of $\eta_{RS}=1/6$, the eNB can simply signal a value of $P_B=0$ to the UE. In this case, upon receiving this signal $P_B=0$, the UE will read Table 11 and will figure out that $\rho_B/\rho_A=1$ for the 1 Tx case, and $\rho_B/\rho_A=5/4$ in the 2 or 4 Tx case Comparing Table 9 with Tables 1-3, although the intermediate value $\eta_{RS}$ does not explicitly show up in Table 9, it can be shown that any pairs of values in each row in Table 9 follows the relationship of the two equations for $$1T \times \frac{6}{5}(1 - \eta_{RS})\frac{P_{B,k}}{P_{RS}}$$

(left column of Table 1), and for 2/4

$$T \times \frac{3}{2}(1 - \eta_{RS})\frac{P_{B,k}}{P_{RS}}$$

(left column of Table 2, 3). In particular, the ratios of these two values are always $$\frac{6}{5}(1 - \eta_{RS})\frac{P_{B,k}}{P_{RS}} \Big/ \frac{3}{2}(1 - \eta_{RS})\frac{P_{B,k}}{P_{RS}} = 4/5,$$

as is observed by the pair of $\rho_B/\rho_A$ values in each row of Table 9.

In should be appreciated that the functions necessary to implement the present invention may be embodied in whole or in part using hardware, software, firmware, or some combination thereof using micro-controllers, micro-processors, digital signal processors, programmable logic arrays, or any other suitable types of hardware, software, and/or firmware.

While the present invention has been shown and described in connection with the preferred embodiments, it will be apparent to those skilled in the art that modifications and variations can be made without departing from the spirit and scope of the invention as defined by the appended claims.

What is claimed is:

1. A method of determining a downlink transmit power from a base station at a wireless terminal, the base station and the wireless terminal having a plurality of orthogonal frequency division multiplexing (OFDM) symbols for transmission, the method comprising:
   receiving a signaling parameter from the base station; and
   determining a ratio of a first ratio of traffic data to pilot, T2P, for first OFDM symbols to a second ratio of T2P for second OFDM symbols based on the signaling parameter and a number of cell-specific antenna ports configured in the base station,
   wherein the ratio of the first ratio to the second ratio for one cell-specific antenna port for the signal parameter 0, 1, 2, or 3 is respectively 1, 4/5, 3/5 or 2/5.

2. The method of claim 1, wherein the wireless terminal assumes that downlink reference symbol Energy Per Resource Element (EPRE) is constant across a downlink system bandwidth and is constant across all subframes until different Reference Signal (RS) power information is received.

3. The method of claim 1, wherein the first ratio or the second ratio is equal among traffic data Resource Elements (REs) for each OFDM symbol.

4. The method of claim 1, wherein the second ratio is acquired based upon a terminal-specific parameter signaled from the base station by higher layers.

5. The method of claim 1, wherein the first ratio is a ratio of a Physical Downlink Shared Channel (PDSCH) Energy Per Resource Element (EPRE) to cell-specific Reference Signal (RS) EPRE among PDSCH Resource Elements (REs) for the first OFDM symbols containing RSs, and the second ratio is a ratio of PDSCH EPRE to cell-specific RS EPRE among PDSCH REs for the second OFDM symbols not containing RSs.

6. An apparatus of a wireless terminal for determining a downlink transmit power from a base station, the base station and the wireless terminal utilizing a plurality of orthogonal frequency division multiplexing (OFDM) symbols for transmission, the apparatus comprising:
   an antenna unit configured to receive a signaling parameter from the base station; and
   a power setting unit configured determine a ratio of a first ratio of traffic data to pilot, T2P, for first OFDM symbols to a second ratio of T2P for second OFDM symbols, based on the signaling parameter and a number of cell-specific antenna ports configured in the base station,
   wherein the ratio of the first ratio to the second ratio for one cell-specific antenna port for the signaling parameter is 0, 1, 2, or 3 is respectively 1, 4/5, 3/5, or 2/5, and
   wherein the ratio of the first ratio to the second ratio for 2 or 4 of cell-specific antenna ports for the signaling parameter is 0, 1, 2, or 3 is respectively 5/4, 1, 3/4, or 1/2.

7. The apparatus of claim 6, wherein the wireless terminal assumes downlink reference symbol Energy Per Resource Element (EPRE) is constant across a downlink system bandwidth and is constant across all subframes until different Reference Signal (RS) power information is received.

8. The apparatus of claim 6, wherein the first ratio or the second ratio is equal among traffic data Resource Elements (REs) for each OFDM symbol.

9. The apparatus of claim 6, wherein the second ratio is acquired based a terminal-specific parameter signaled from the base station by higher layers.

10. The apparatus of claim 6, wherein the first ratio is a ratio of a Physical Downlink Shared Channel (PDSCH) Energy Per Resource Element (EPRE) to cell-specific Reference Signal (RS) EPRE among PDSCH Resource Elements (REs) for the first OFDM symbols containing RSs, and the second ratio is a ratio of PDSCH EPRE to cell-specific RS EPRE among PDSCH REs for the second OFDM symbols not containing RSs.

11. A method of determining a downlink transmit power for at least one wireless terminal at a base station, the base station and the wireless terminal utilizing a plurality of orthogonal frequency division multiplexing (OFDM) symbols for transmission, the method comprising:
   transmitting a signaling parameter to the at least one wireless terminal in a cell by higher layers; and
   transmitting traffic data by using one of a first ratio of traffic data to pilot, T2P, for first OFDM symbols and a second ratio of T2P for second OFDM symbols,
   wherein a ratio of the first ratio to the second ratio is determined based on the signaling parameter and a number of cell-specific antenna ports configured in the base station,
   wherein the ratio of the first ratio to the second ratio for one cell-specific antenna port for the signaling parameter is 0, 1, 2, or 3 is respectively 1, 4/5, 3/5, or 2/5, and
   wherein the ratio of the first ratio to the second ratio for 2 or 4 of cell-specific antenna ports for the signaling parameter is 0, 1, 2, or 3 is respectively 5/4, 1, 3/4, or 1/2.

12. The method of claim 11, wherein the first ratio or the second ratio is equal among traffic data Resource Elements (REs) for each OFDM symbol.

13. The method of claim 11, wherein the second ratio is acquired based a terminal-specific parameter signaled from the base station by higher layers.

14. The method of claim 11, wherein the first ratio is a ratio of a Physical Downlink Shared Channel (PDSCH) Energy Per Resource Element (EPRE) to cell-specific Reference Signal (RS) EPRE among PDSCH Resource Elements (REs) for the first OFDM symbols containing RSs, and the second ratio is a ratio of PDSCH EPRE to cell-specific RS EPRE among PDSCH REs for the second OFDM symbols not containing RSs.

15. An apparatus of a base station for determining a downlink transmit power for at least one wireless terminal, the base station and the wireless terminal utilizing a plurality of orthogonal frequency division multiplexing (OFDM) symbols for transmission, the apparatus comprising:
   an antenna unit configured to transmit a signaling parameter to the at least one wireless terminal in a cell by higher layers; and
   a transmitter configured to transmit traffic data by using one of a first ratio of traffic data to pilot, T2P, for first OFDM symbols and a second ratio of T2P for second OFDM symbols,
   wherein a ratio of the first ratio to the second ratio is determined based on the signaling parameter and a number of cell-specific antenna ports configured in the base station,
   wherein the ratio of the first ratio to the second ratio for one cell-specific antenna port for the signaling parameter is 0, 1, 2, or 3 is respectively 1, 4/5, 3/5, or 2/5, and
   wherein the ratio of the first ratio to the second ratio for 2 or 4 of cell-specific antenna ports for the signaling parameter is 0, 1, 2, or 3 is respectively 5/4, 1, 3/4, or 1/2.

16. The apparatus of claim 15, wherein the first ratio or the second ratio is equal among traffic data Resource Elements (REs) for each OFDM symbol.

17. The apparatus of claim 15, wherein the second ratio is acquired based a terminal-specific parameter signaled from the base station by higher layers.

18. The apparatus of claim 15, wherein the first ratio is a ratio of a Physical Downlink Shared Channel (PDSCH) Energy Per Resource Element (EPRE) to cell-specific Reference Signal (RS) EPRE among PDSCH Resource Elements (REs) for the first OFDM symbols containing RSs, and the second ratio is a ratio of PDSCH EPRE to cell-specific RS EPRE among PDSCH REs for the second OFDM symbols not containing RSs.

* * * * *

UNITED STATES PATENT AND TRADEMARK OFFICE
CERTIFICATE OF CORRECTION

PATENT NO. : 9,113,419 B2
APPLICATION NO. : 13/966102
DATED : August 18, 2015
INVENTOR(S) : Jianzhong Zhang et al.

Page 1 of 1

It is certified that error appears in the above-identified patent and that said Letters Patent is hereby corrected as shown below:

On The Title Page, Item (63) Related U.S. Application Data

Immediately following 8,509,350, please insert --, which is a continuation of application No. 12/314,239, filed on Dec. 5, 2008, now Pat. No. 8,238,455, which claims the benefit of application No. 61/136,328, filed Aug. 28, 2008, and application No. 61/006,343, filed Jan. 7, 2008.--

Signed and Sealed this
Tenth Day of May, 2016

Michelle K. Lee
*Director of the United States Patent and Trademark Office*

UNITED STATES PATENT AND TRADEMARK OFFICE
CERTIFICATE OF CORRECTION

| | |
|---|---|
| PATENT NO. | : 9,113,419 B2 |
| APPLICATION NO. | : 13/966102 |
| DATED | : August 18, 2015 |
| INVENTOR(S) | : Jianzhong Zhang et al. |

It is certified that error appears in the above-identified patent and that said Letters Patent is hereby corrected as shown below:

On The Title Page, Item (63) Related U.S. Application Data

"Immediately following 8,509,350, please insert --, which is a continuation of application No. 12/314,239, filed on Dec. 5, 2008, now Pat. No. 8,238,455, which claims the benefit of application No. 61/136,328, filed Aug. 28, 2008, and application No. 61/006,343, filed Jan. 7, 2008.--" (as corrected to read in the Certificate of Correction issued May 10, 2016) is deleted and patent is returned to its original state with Item (63) in patent to read -- Related U.S. Application Data

(63)   Continuation of application No. 13/541,293, filed on Jul. 3, 2012, now Pat. No. 8,509,350. --

Signed and Sealed this
Thirty-first Day of May, 2016

Michelle K. Lee
*Director of the United States Patent and Trademark Office*